US009906091B2

(12) United States Patent
Jensen

(10) Patent No.: US 9,906,091 B2
(45) Date of Patent: Feb. 27, 2018

(54) GENERATOR SUSPENSION ARRANGEMENT

(71) Applicant: SIEMENS AKTIENGESELLSCHAFT, München (DE)

(72) Inventor: Jens Bomholt Jensen, Horsens (DK)

(73) Assignee: SIEMENS AKTIENGESELLSCHAFT (DE)

( * ) Notice: Subject to any disclaimer, the term of this patent is extended or adjusted under 35 U.S.C. 154(b) by 237 days.

(21) Appl. No.: 14/749,685

(22) Filed: Jun. 25, 2015

(65) Prior Publication Data

US 2016/0020667 A1 Jan. 21, 2016

(30) Foreign Application Priority Data

Jul. 18, 2014 (EP) .................... 14177635

(51) Int. Cl.
 *H02K 5/24* (2006.01)
 *H02K 5/26* (2006.01)
 *F03D 80/80* (2016.01)
 *F03D 9/25* (2016.01)

(52) U.S. Cl.
 CPC ............ *H02K 5/24* (2013.01); *F03D 9/25* (2016.05); *F03D 80/88* (2016.05); *H02K 5/26* (2013.01); *F05B 2260/964* (2013.01); *Y02E 10/725* (2013.01)

(58) Field of Classification Search
 CPC .... H02K 5/24; H02K 5/26; F03D 9/25; F03D 80/60; F03D 80/88; Y02E 10/725; F05B 2260/964
 USPC ...................... 290/44, 55; 310/51
 See application file for complete search history.

(56) References Cited

U.S. PATENT DOCUMENTS

| 6,232,673 | B1 | 5/2001 | Schoo |
| 6,750,559 | B2 | 6/2004 | Becker |
| 7,008,348 | B2 * | 3/2006 | LaBath ............... F16H 37/041 |
| | | | 475/338 |

(Continued)

FOREIGN PATENT DOCUMENTS

| EP | 1715182 A1 | 10/2006 |
| EP | 1327073 B1 | 12/2007 |

(Continued)

OTHER PUBLICATIONS

European Extended Search Report dated Jan. 20, 2015; Application No. 14177635.1-1607; Siemens Aktiengesellschaft; 7 pgs.

*Primary Examiner* — Ramon M Barrera
(74) *Attorney, Agent, or Firm* — Schmeiser Olsen & Watts LLP

(57) ABSTRACT

A generator suspension arrangement for suspending a generator unit of a wind turbine is shown, which generator suspension arrangement includes a suspension assembly arranged on a bedframe of the wind turbine, which suspension assembly includes a plurality of suspension points configured to transfer the weight of the generator unit to the suspension assembly, and wherein the suspension points lie at a distance outward from the body of the generator unit. Furthermore, a wind turbine includes a generator unit and such a generator suspension arrangement arranged to suspend the generator unit above a bedframe of the wind turbine. Furthermore, a method of reducing vibrations of a generator unit of a wind turbine is shown.

16 Claims, 7 Drawing Sheets

(56) References Cited

U.S. PATENT DOCUMENTS

| | | | | |
|---|---|---|---|---|
| 8,075,442 B2* | 12/2011 | Ciszak | ............. | F03D 15/00 |
| | | | | 475/331 |
| 2007/0090269 A1* | 4/2007 | Bonnet | ............. | F16F 15/08 |
| | | | | 248/560 |
| 2008/0272602 A1 | 11/2008 | Kim et al. | | |
| 2013/0088016 A1* | 4/2013 | Dinter | ............. | F03D 11/02 |
| | | | | 290/55 |
| 2014/0175802 A1* | 6/2014 | Taniyama | ............. | F03D 9/002 |
| | | | | 290/55 |

FOREIGN PATENT DOCUMENTS

| | | | |
|---|---|---|---|
| EP | 2525476 A2 | | 11/2012 |
| KR | 20090070914 A | * | 7/2009 |

\* cited by examiner

GENERATOR SUSPENSION ARRANGEMENT

CROSS REFERENCE TO RELATED APPLICATIONS

This application claims priority European Application No. EP 14177635, having a filing date of Jul. 18, 2014, the entire contents of which are hereby incorporated by reference.

FIELD OF TECHNOLOGY

The following relates to a generator suspension arrangement; a wind turbine; and a method of reducing vibrations of a generator assembly.

BACKGROUND

A number of basic types of wind turbine can be used to generate electrical power. One basic type comprises a rotor with an arrangement of rotor blades for turning a low-speed shaft. The low-speed shaft is connected to a gearbox, which can convert the relatively slow rotation of the rotor and low-speed shaft into a higher rotational velocity suitable for driving a generator. A high-speed shaft extends from the gearbox to a generator. This type of generator is sensitive to alignment of the various components and to coupling of vibrations or oscillations between the various components. Any vibration in the low-speed shaft, for example, can be transferred to the gearbox. Any vibration of the gearbox can be transferred in turn to the high-speed shaft and to the generator. Since the rotating component of the generator has a relatively high rotational velocity, such vibrations can present a serious problem. However, structural properties, manufacturing tolerances as well as the usual wear and tear on the relevant components of the wind turbine mean that vibrations and oscillations cannot realistically be eliminated entirely. For example, tower vibrations cannot be completely damped; generator cogging torque can be reduced but not entirely eliminated; etc. Therefore, much effort is invested in attempting to reduce the effects of oscillation and vibration in this type of wind turbine. For example, stationary components such as the gearbox and generator can be mounted on dampers such as rubber mounting feet in an attempt to at least partially absorb the vibration. In such an approach, for example, the generator can rest on a number of rubber mounting feet arranged on a floor or base of the wind turbine's nacelle, underneath the generator. However, since the generator is basically a cylindrical structure "lying on its side", the placement of any such mounting feet is limited to a narrow region underneath the body of the generator. The ability of such mounting feet to absorb the forces resulting from vibration of the generator during operation is limited since they are only effective at absorbing forces that are transferred directly from the generator body to the mounting feet themselves. Any force with a direction that does not pass through the mounting feet will not be absorbed, so that the generator may experience mild to severe vibration during operation.

If the vibrations reach a level which might lead to damage of the generator or other wind turbine components, it may be necessary to reduce the output power of the generator. Clearly, such a reduction in output power is associated with a loss in revenue and is highly undesirable. In any case, vibrations ultimately result in fatigue damage to various components and parts of the generator and are therefore very problematic.

SUMMARY

An aspect relates to an improved way of reducing the vibrations of a generator of such a wind turbine.

The generator suspension arrangement for suspending a generator unit of a wind turbine comprises a suspension assembly arranged on a bedframe of the wind turbine, which suspension assembly comprises a plurality of suspension points realized to transfer the weight of the generator unit to the suspension assembly, and wherein the suspension points are arranged at a distance outward from the body of the generator unit.

An advantage of the generator suspension arrangement is that the generator is very stably supported by the suspension assembly, even if there are vibrations of the high-speed shaft during operation. The suspension points can be located favourably close to the body of the generator, and by arranging the suspension points of the suspension assembly outside the body of the generator unit, i.e. to hold the generator assembly in a suspended and "low-slung" fashion, vibrations that arise during operation of the wind turbine can be very favourably transferred to and absorbed by the generator suspension arrangement. Essentially all loading forces arising from vibrations will be transferred via the suspension points into the suspension assembly, so that, in contrast to the conventional mounting solutions, vibrations of the high-speed shaft will not result in vibration of the generator. The distance between the generator body and the suspension points preferably comprises a distance in the range of 0.0-300 mm. The suspension points can be arranged close to the body of the generator.

The wind turbine comprises a generator unit, which generator unit comprises a generator for generating electric power, and such a generator suspension arrangement arranged to support the generator unit.

An advantage of the wind turbine is that fatigue damage to components of the wind turbine can be reduced. For example, since the vibrations of the high-speed shaft can be very effectively transferred to the generator suspension arrangement as described above, damage that would otherwise arise from those vibrations can be reduced or even eliminated. The generator suspension arrangement can therefore contribute to a lifetime extension of the wind turbine.

The method of reducing vibrations of a generator unit of a wind turbine comprises the steps of arranging a suspension assembly of a generator suspension arrangement according to any of claims 1 to 12 on a bedframe of the wind turbine; and connecting a generator unit to the suspension points of the suspension assembly to transfer the weight of the generator unit to the suspension assembly.

An advantage of the method lies in the simple approach to provide stable support of the generator unit. The generator suspension arrangement can be realised without any significant increase in cost, and without any significant alteration or adaptation of structural components such as the bedframe, as will be explained below. Therefore, the method provides a cost-effective and efficient way of reducing the impact of vibrations in a wind turbine generator.

Particularly advantageous embodiments and features of the invention are given by the dependent claims, as revealed in the following description. Features of different claim categories may be combined as appropriate to give further embodiments not described herein.

In the following, it may be assumed that the wind turbine comprises an arrangement of rotor blades for turning a low-speed shaft, a gearbox, and a high-speed shaft connected to a generator. Since the windings of an electric generator become hot during operation of the generator, particularly at power output levels close to rated power output, a wind turbine generator is usually cooled by some kind of cooling arrangement mounted in close proximity to the generator. Therefore, in the following but without restricting embodiments of the invention in any way, it may be assumed that the "generator unit" comprises not only the generator but also any number of additional components mounted onto the body of the generator, for example a cooling or ventilation module mounted on top of the generator body. Of course, the generator unit may just comprise the generator itself.

The generator suspension arrangement can be realized to connect to the generator in any suitable manner. For example, suspension points can be arranged in any combination along the sides and/or along the front end and/or along the rear end of the generator unit. In a particularly preferred embodiment, the suspension assembly comprises a front suspension assembly realized to suspend a front end of the generator unit and a rear suspension assembly realized to suspend a rear end of the generator unit. In this way, the front of the generator can be suspended by one or more suspension points, while the rear of the generator can be suspended by one or more suspension points. The placement of suspension points at the front and rear ends of the generator is particularly effective for the absorption of vibrations, since the high-speed shaft of the wind turbine enters the generator unit at the front and extends to the rear. Therefore, vibrations of the high-speed shaft can be uniformly passed to the arrangement of suspension points.

The suspension points can be arranged favourably close to the body of the generator. Usually, the generator is arranged within a portion of a bedframe supporting structure or framework, and may be lowered into the bedframe (already mounted on top of the wind turbine tower) by a crane during an assembly procedure. Depending on the physical realisation of the bedframe and the generator, some clearance may be required. Therefore, in a particularly preferred embodiment, the distance between the generator body and the suspension points comprises a distance in the range of 0.0-300 mm. In this way, a favourable close fitting installation is made possible.

The generator can be connected to the generator suspension arrangement in any suitable manner. However, in a particularly preferred embodiment, the generator suspension arrangement comprises an interface structure realized for connecting the generator unit to the suspension assembly. For example, an interface structure could be realized as an end plate for mounting to the front end of the generator, with a number of brackets extending outward from the end plate, so that a bracket extends towards a suspension point. One such end plate could be realized for mounting to the front end of the generator, while another such end plate could be realized for mounting to the rear end of the generator.

As indicated above, vibrations or oscillations are transferred to the generator by the high-speed shaft. Therefore, in a preferred embodiment, the interface structure comprises at least one suspension plate realized to extend from the interface structure to the suspension assembly. Such a suspension plate can be held between a suspension point and a bracket of the interface end plate, for example. Preferably, a suspension plate extends from the interface structure in a plane essentially parallel to the axis of rotation of the generator. In this way, any loading forces ensuing from vibrations of the rotating high-speed shaft will be optimally transferred from the generator unit to the generator suspension arrangement. Such a suspension plate can be realized as a thick steel plate connected in some suitable way to a suspension point. In a preferred embodiment, the suspension assembly comprises a number of clamps, whereby a clamp is realized to clamp about such a suspension plate. In a particularly preferred embodiment, such a clamp is also arranged in a plane essentially parallel to the axis of rotation of the generator, so that loading forces arising from the vibrations are transferred very effectively from the generator unit and into the generator suspension arrangement.

As indicated above, the suspension points are located at a distance outward from the body of the generator, i.e. outside a "footprint" of the generator, wherein the generator footprint is to be understood as the outline of the generator when viewed from above. The usual cylindrical shape of a generator, for example, will have an essentially rectangular "footprint". As explained above, the suspension points are arranged outside a footprint of the generator unit, whereby the footprint may be understood to be taken in a mounting plane defined by the suspension points. Preferably, the suspension points are arranged about a favourably "large" footprint. The favourable reduction in loading forces at the suspension points is achieved in the generator suspension arrangement by arranging the suspension points widely apart. In a preferred embodiment, a pair of suspension points (at the front or rear end of the generator) is separated by a distance comprising at least 100%, more preferably at least 115%, most preferably at least 130% of the diameter of the generator. For example, a pair of suspension points can be separated by a distance comprising 133% of the generator diameter in a "low-slung" supporting arrangement.

Another parameter used to quantify a realisation of the generator suspension arrangement can be the projected distance between a suspension point and the base of the generator. For example, a suspension point at the front of the generator is offset from the base of the generator by a first distance, and a suspension point at the rear of the generator is offset from the base of the generator by a second distance. A very favourably stable suspension can be achieved when the sum of these distances is about half of the generator diameter. Therefore, in a preferred embodiment, the sum of these distances preferably comprises 40%-60% of the generator diameter. The suspension points at the front of the generator can be higher than, or at the same level as, the suspension points at the rear of the generator. Equally, the suspension points at the front of the generator can be lower than the suspension points at the rear of the generator.

In a further preferred embodiment, the generator suspension arrangement comprises a vertical offset structure arranged underneath the suspension points of the suspension assembly. In a preferred embodiment, the vertical offset structure comprises an I-beam. For example, one I-beam can be arranged underneath the suspension points at the front of the generator, and a second I-beam can be arranged underneath the suspension points at the rear end of the generator. An I-beam can be arranged in a transverse manner relative to longitudinal I-beams of the bedframe, and can be secured to the longitudinal beams in any suitable manner, for example by means of a bolted connection, a welded connection, etc. In this way, the suspension points can be realized on a stable and structurally strong basis, since the bedframe is usually constructed using sturdy I-beams or joists of structural steel. Preferably, the vertical offset structure and the suspension assembly are realized such that no additional height is added to the generator arrangement, i.e. so that the generator does not need to be mounted at a higher level relative to the bedframe. In this way, existing generator designs can be mounted using the generator suspension arrangement without any additional design effort.

To suppress propagation of vibration from the generator and into the supporting structures such as the vertical offset structures and the bedframe, in a preferred embodiment the generator suspension arrangement comprises a damper between each suspension point and its vertical offset structure. A damper can comprise a rubber mat, for example, or any other suitable shock-absorbing element. Preferably, the damper comprises a vertical stiffness in the range 13.0-14.0 kN/mm.

Usually, the drive shaft of a wind turbine is arranged to tilt upward from the horizontal by a few degrees, for example by about 6°, so that the rotor blades do not collide with the tower. The generator is therefore also arranged at such a tilt angle, so that the front end of the generator is slightly higher than the rear end. In one preferred embodiment, the mounting plane defined by the suspension points comprises an essentially horizontal plane. This means that any interface structure between the generator unit and the generator suspension arrangement preferably takes into account this angle of tilt. For example, a suspension assembly can be realized to meet a corresponding suspension plate at this angle of tilt, while at the same time being mounted to a vertical support structure.

The front end plate, bracket and suspension plate arrangement and the rear end plate, bracket and suspension plate arrangement are preferably realized such that the suspension points are in the same horizontal plane, even if the vertical support structures at the front end and rear end of the generator unit are of equal height. This can be achieved by arranging the brackets and suspension plates of the rear end plate at a higher level than those of the front end plate. This will become clear from the drawings.

In an alternative embodiment, a mounting plane defined by the suspension points comprises an inclined plane, which inclined plane is essentially parallel to an axis of rotation of the generator unit. In such a realisation, the front end plate, bracket and suspension plate arrangement and the rear end plate, bracket and suspension plate arrangement are preferably realized such that the suspension plates lie in the same inclined plane as the suspension points. This can be achieved by arranging a higher vertical support structure at the front end of the generator unit, and a lower vertical support structure at the rear end of the generator unit.

For any embodiment of the generator suspension arrangement, the suspension points of the suspension assembly are preferably arranged such that the centre of mass of the generator unit lies in the mounting plane or at a distance above the mounting plane, which distance comprises at most 20% of a diameter of the generator unit. For example, if the generator unit comprises basically just the generator, its centre of mass will lie essentially half-way along the axis of rotation of the generator. However, if a heavy module such as a cooling arrangement is mounted on top of the generator such that the mass of the generator unit comprises the mass of the generator as well as the mass of the cooling arrangement, the centre of mass of this generator unit will be at a distance removed from the axis of rotation of the generator, i.e. the centre of mass is displaced in the direction of the cooling arrangement.

The generator suspension arrangement can comprise any number of suspension points. In a particularly preferred embodiment, the suspension assembly comprises an essentially rectangular arrangement of four suspension points, wherein two front suspension points are arranged to support the front end of the generator unit and two rear suspension points are arranged to support the rear end of the generator unit.

BRIEF DESCRIPTION

Some of the embodiments will be described in detail, with reference to the following figures, wherein like designations denote like members, wherein.

DETAILED DESCRIPTION

Figure 1:
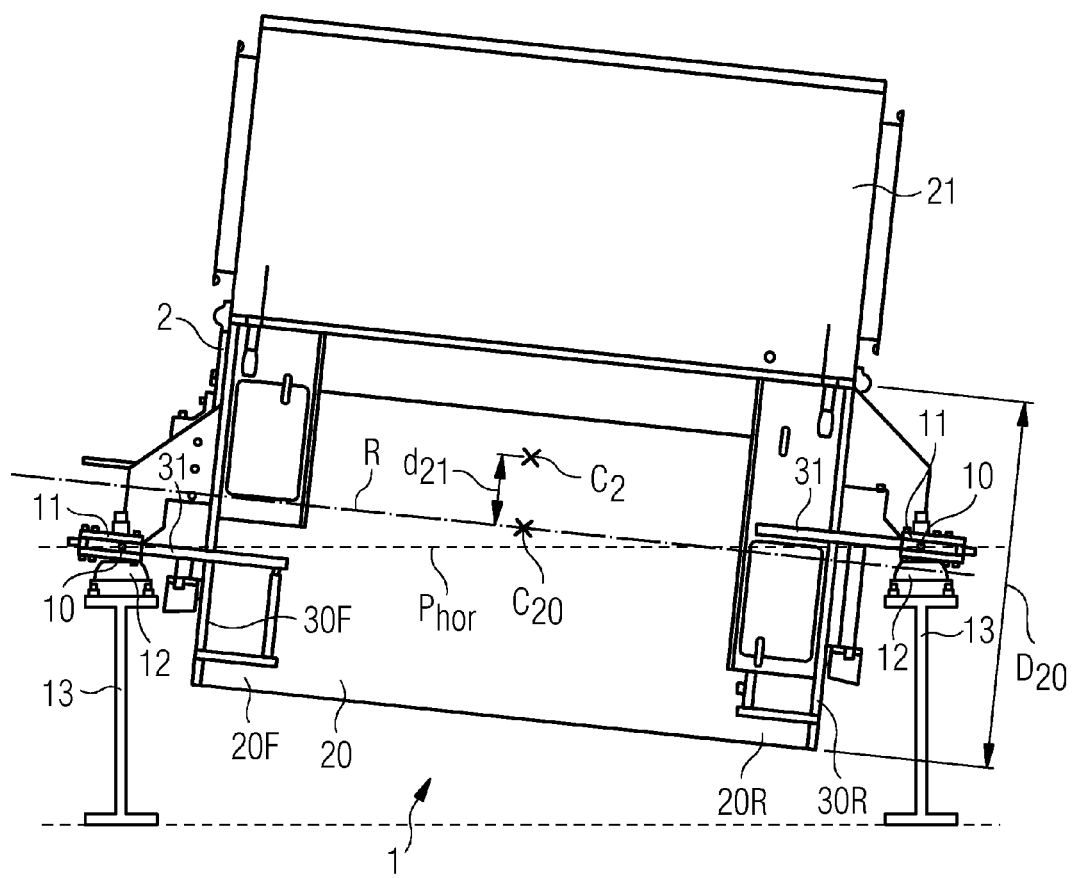
FIG. 1 shows a schematic side view of a first embodiment of a generator suspension arrangement.

FIG. 1 shows a schematic side view of a first embodiment of a generator suspension arrangement 1. The diagram shows a generator unit 2 of a wind turbine resting on suspension points 10. The generator unit 2 comprises a generator 20, and a cooling arrangement 21 mounted on top of the generator 20. The centre of mass $C_{20}$ of the generator 20 would usually lie on at a point on the axis of rotation R of the generator 20. However, since the cooling arrangement also has a significant weight and is mounted on top of the generator 20, the centre of mass $C_2$ of the generator unit 2 therefore lies above the axis of rotation R of the generator 20. For example, for a generator 20 with a mass of 8 tons and a cooling arrangement with a mass of 2 tons, the combined centre of mass $C_2$ will be at above the axis of rotation R by a distance $d_{21}$ of about 20% of the generator diameter $D_{20}$.

The diagram also shows interface assemblies 30F, 30R to facilitate connection of the generator unit 2 to the generator suspension arrangement 1. The interface assemblies 30F, 30R are mounted to the front and rear ends 20F, 20R of the generator 20, and are realized to fit about a set of suspension plates 31. The diagram shows two such suspension plates 31 on one side of the generator 20, and a further two suspension plates 31 may be visualized on the other (hidden) side of the generator 20. Each suspension plate 31 is held by a clamp 11 of a suspension assembly 10, 11, 12, such that the weight of the generator unit 2 is transferred to the suspension assembly 10, 11, 12 via a suspension point 10. In this exemplary embodiment, each suspension point 10 is located centrally over a damper 12 and a vertical offset structure 13 which in turn is mounted to a bedframe structure (partially indicated in the diagram by horizontal broken lines) of the wind turbine. The four suspension points 10, when connected by virtual lines, define a horizontal mounting plane $P_{hor}$ as indicated in the diagram by the dashed line.

Figure 2:
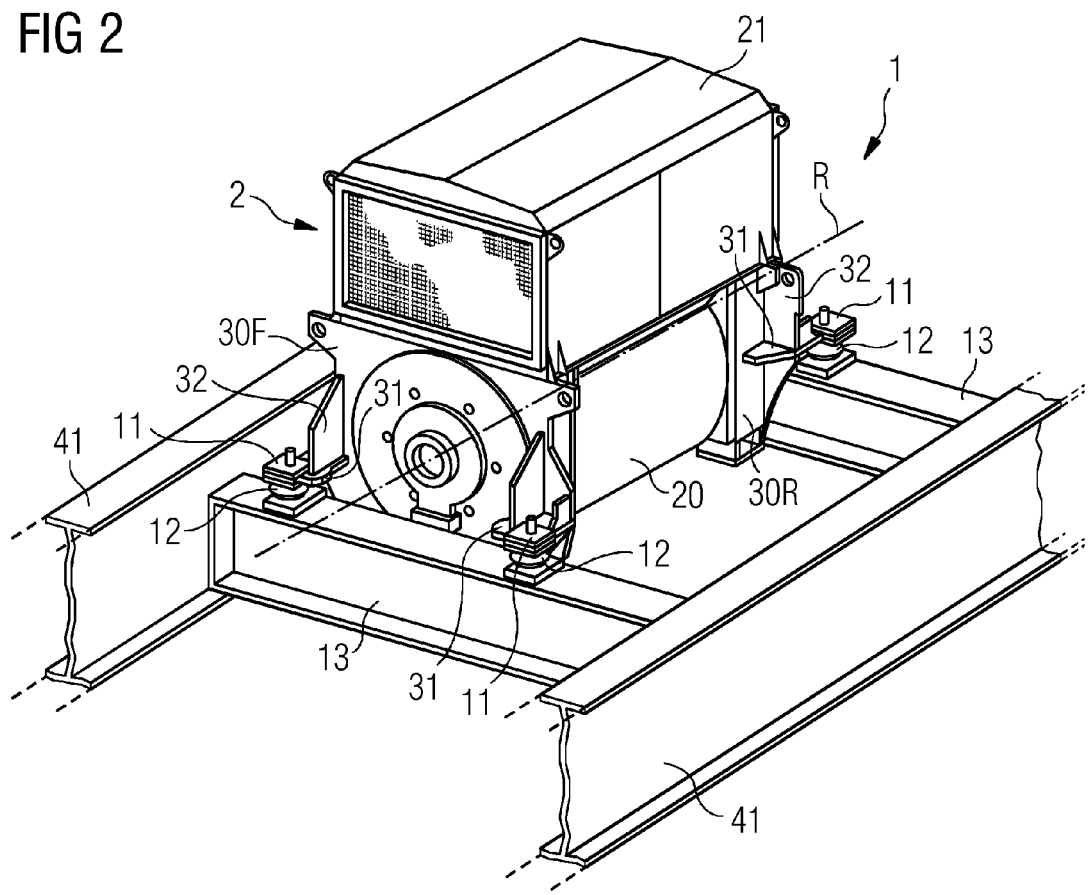
FIG. 2 shows a perspective view of the first embodiment of the generator suspension arrangement of FIG. 1.

FIG. 2 shows a perspective view of the generator suspension arrangement 1 of FIG. 1, holding a generator unit 2. A bedframe 41 comprises two longitudinal I-beams 41 of a support framework that is generally mounted to the top of the wind turbine tower. A nacelle or canopy is generally secured to that support framework. The diagram only shows parts that are relevant to the generator suspension arrangement, and clearly shows the upwardly tilted position of the generator 20 relative to a horizontal bedframe of the wind turbine. The angle of tilt may be about 6°. The diagram also shows the interface structures 30F, 30R with brackets 32 for mating with suspension plates 31, and the clamps 11 for clamping about the suspension plates 31. The dampers 12 for the suspension points are arranged over two vertical support structures 13, which provide a vertical offset from the "floor" of the nacelle in which the bedframe 41 is mounted.

Figure 3:
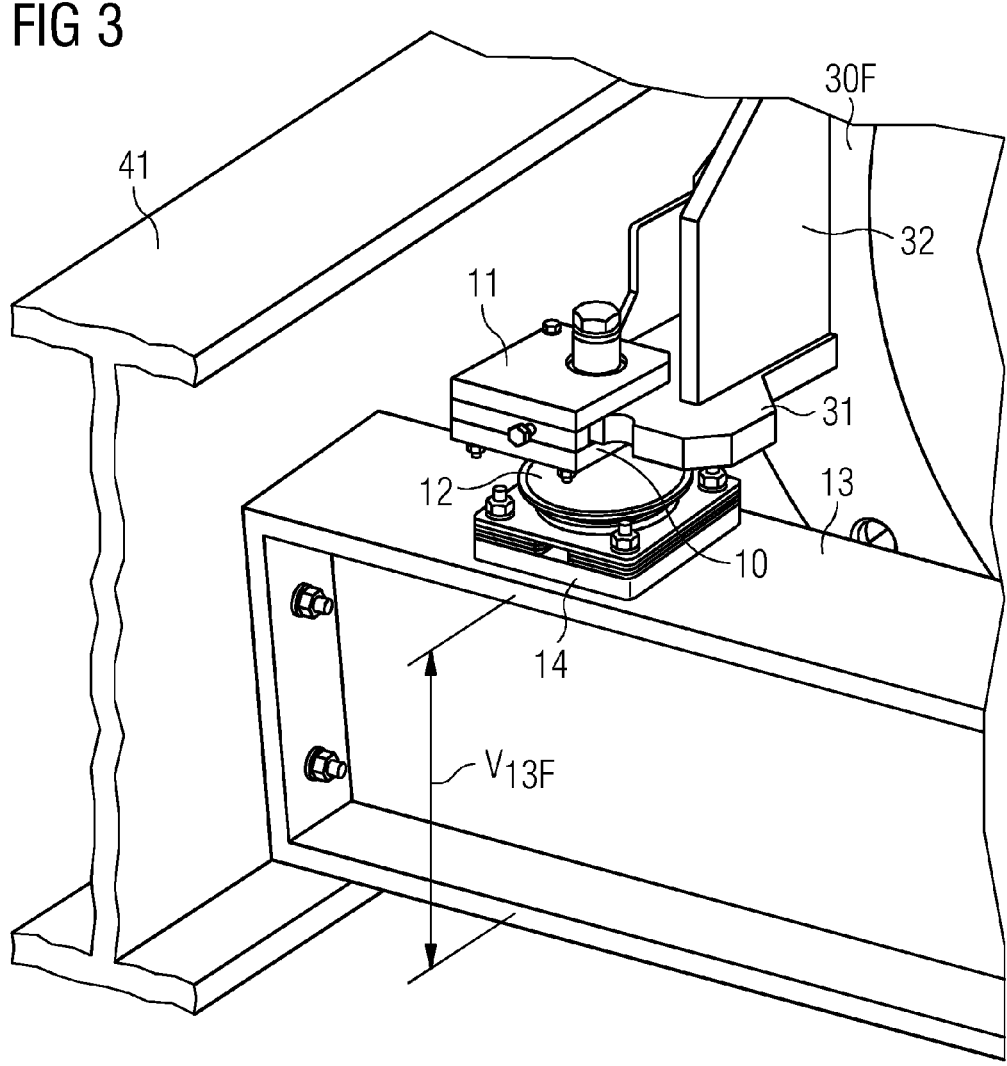
FIG. 3 shows a detail of an embodiment of a suspension assembly of the generator suspension arrangement of FIG. 2.

FIG. 3 shows a detail of a suspension assembly 10, 11, 12 of the generator suspension arrangement 1 of FIG. 2. This larger view shows clearly how a clamp 11 fits about a suspension plate 31, which in turn is held by a bracket 32 of a front plate 30F of the interface structure. The suspension plate 31 in the clamp 11 acts to transfer the weight of the generator effectively through one point—the suspension point 10—to the vertical offset structure 13 and then to the bedframe 41 to which the vertical offset structure 13 is mounted. The diagram also shows a damper 12 between the clamp 11 and a base 14. The damper 12 is shown as a rubber cup-like element that acts as a shock absorber to dampen any vibrations during operation of the generator 20. The height $v_{13F}$ of the vertical offset structure 13, along with any relevant height of the other components 10, 11, 12, 14 of the suspension assembly define the height of a corner of the mounting plane $P_{hor}$ shown in FIG. 1.

Figure 4:
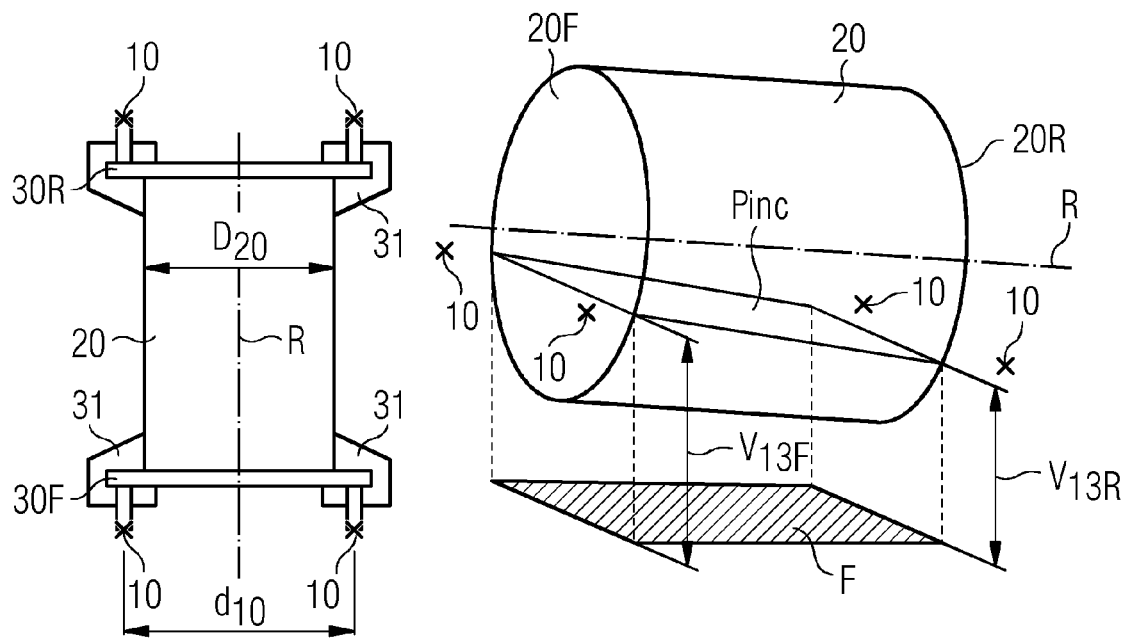
FIG. 4 shows a schematic plan view of a second embodiment of a generator suspension arrangement.

FIG. 4 shows schematic views of a second embodiment of a generator suspension arrangement 1. On the left-hand side of the diagram, a plan view indicates the generator 20, the front and rear ends 30F, 30R of an interface structure 3, four suspension plates 31, and four suspension points 10 (indicated by "x" in each case). Here, it can be seen that the suspension points 10 are arranged at a distance laterally outward from the generator 20, so the distance $d_{10}$ between the suspension points 10 exceeds the generator diameter $D_{20}$.

On the right-hand side of the diagram, a simplified perspective view shows the generator 20 and the four suspension points 10 relative to the front end 20F and the rear end 20R of the generator 20. In this embodiment, the suspension points 10 at the front end 20F of the generator 20 are at a height $v_{13F}$ which is higher than the height $v_{13R}$ of the suspension points 10 at the rear end 20R of the generator 20, so that the mounting plane $P_{inc}$ is inclined. The points at the body of the generator 20 that effectively correspond to the suspension points 10 define a slice through the generator body. When projected onto a horizontal plane, as indicated in the diagram, a corresponding "footprint" F may be visualized. The diagram indicates that the suspension points 10 lie outside this footprint F.

Figure 5:
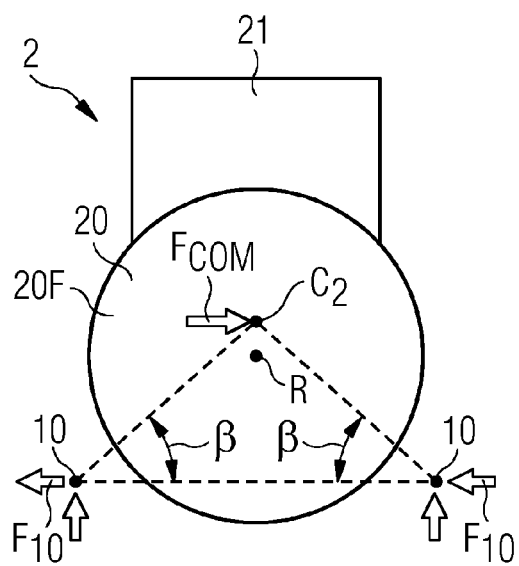
FIG. 5 shows a schematic representation of the forces acting on a generator unit in an embodiment of a generator suspension arrangement.
Figure 6:
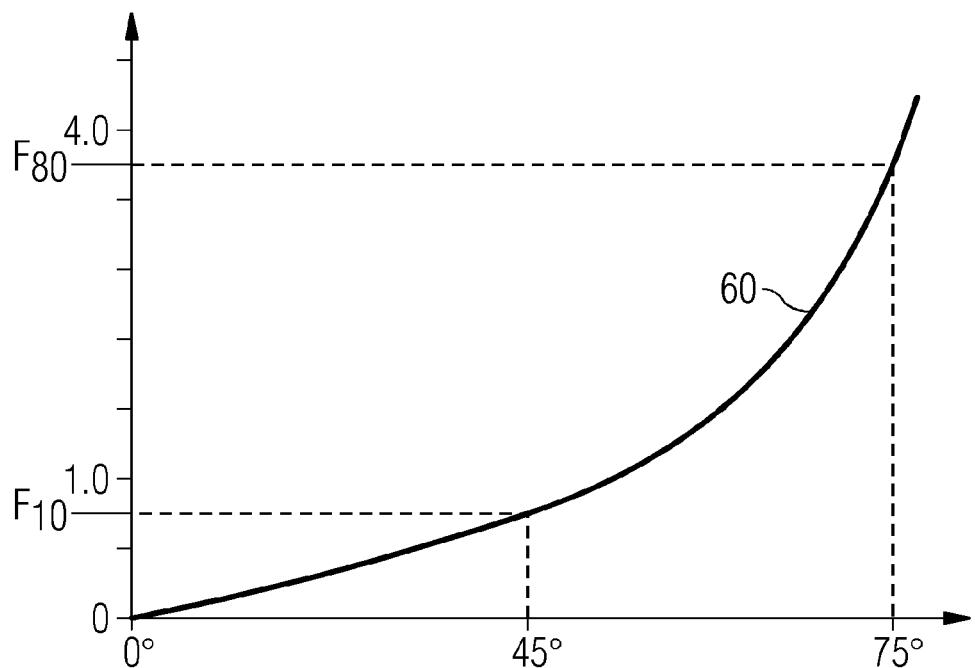
FIG. 6 shows a graph of reaction force against mounting angle.

FIG. 5 shows a schematic representation of the relationship between generator mounting means and the centre of mass $C_2$ of a generator unit 2. The generator 20 is indicated here, looking at the front end 20F. The diagram shows a mounting arrangement, in which the generator 20 is suspended from suspension points 10 of a generator suspension arrangement. Regarding the two suspension points 10 as outer corners of an isosceles triangle, the centre of mass $C_2$ of the generator unit 2 is the apex of this triangle, which may be regarded as a "stability triangle", since a suspension arrangement may be considered stable if the points defining this triangle satisfy certain properties as will become clear in the following. Any forces acting on the generator 20—resulting from a vibrating rotor shaft, tower oscillations, cogging torque, etc.—can be regarded as a collective force $F_{COM}$ acting at the centre of mass $C_2$ of the generator unit 2. Owing to the rotating behaviour of the generator 20 and the various sources of loading forces, the force $F_{COM}$ is neither static nor constant, and can act on the centre of mass $C_2$ from any direction. This force $F_{COM}$ will be countered by a reaction force $F_{10}$ at the generator's suspension points. For the generator suspension assembly, the suspension points 10 are relatively widely spaced. For example, the distance $d_{10}$ between the suspension points 10 can comprise 133% of the generator diameter $D_{20}$. The effect of this arrangement is that the relative reaction force $F_{10}$ at the suspension points 10 is small. This is shown in FIG. 6, which shows a graph 60 of relative reaction in units of force [N] at the suspension points 10 of a generator unit 2, against angle β[°]. For an angle β of about 45°, the relative reaction is only about ±0.5, i.e. the magnitude of the reaction force $F_{10}$ is only about half that of the force $F_{COM}$ and acts in the same direction or in the opposite direction as the force $F_{COM}$. The generator unit 2 will therefore not vibrate significantly in response to a force $F_2$ acting on its centre of mass $C_2$.

Figure 7:
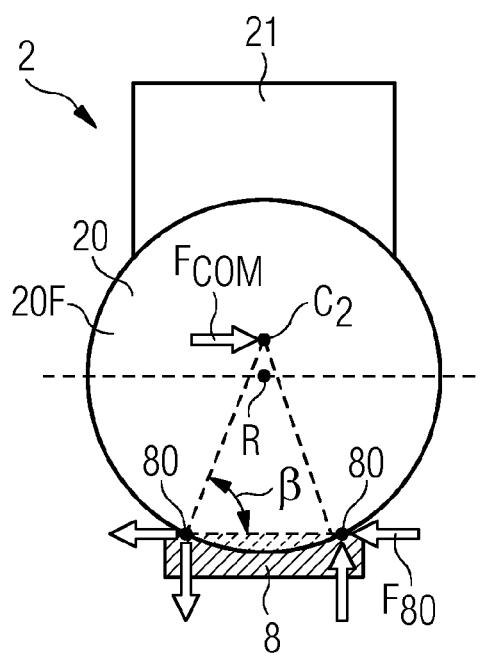
FIG. 7 shows a schematic representation of the forces acting on a generator unit in generator mounting arrangement.

FIG. 7 shows a mounting arrangement in which the generator 20 of a generator unit 2 rests on one or more mounting feet 8 arranged underneath the generator 20. A triangle defined by the outer corners 80 of the mounting foot 8 and the centre of mass $C_2$ of the generator unit 2 is again an isosceles triangle, in this case with an angle in excess of 75° at each outer corner 80 of the mounting foot 8. In this realisation, the forces $F_{COM}$ acting on the centre of mass $C_2$ of the generator unit 2 will again be countered by a reaction force $F_{80}$ at the generator's mounting points, but the reaction force $F_{80}$ will be significantly larger. This is also indicated in FIG. 6, which shows that the relative reaction reaches values of about ±4.0 for an angle β of about 75° at the outer corners 80 of the mounting foot 8, i.e. the magnitude of the reaction force $F_{80}$ is four times as large as the force $F_{COM}$ acting on the centre of mass $C_2$ of the generator unit 2. This mounting arrangement is therefore associated with considerable vibration or instability during operation of the generator 20.

Figure 8:
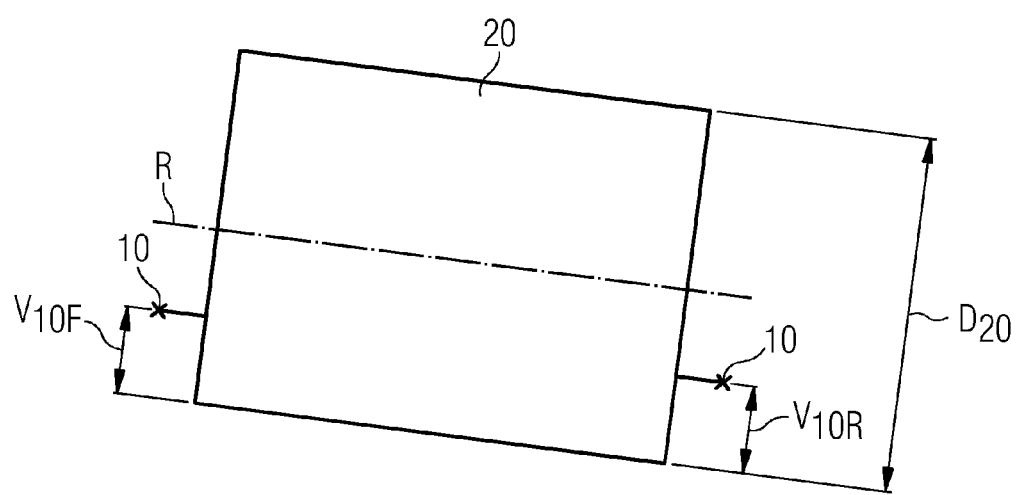
FIG. 8 shows a simplified side view of a generator held in a generator suspension assembly.

FIG. 8 shows another simplified side view of a generator 20 held in a generator suspension assembly. The diagram indicates the distance $v_{10F}$ between a suspension point 10 at the front of the generator 20 and the base of the generator 20; and the distance $v_{10R}$ between a suspension point 10 at the rear of the generator 20 and the base of the generator 20. The sum of these distances ($v_{10F}+v_{10R}$) is between 40% and 60% of the generator diameter $D_{20}$. When the suspension points 10 are arranged in this manner, a very favourable suppression or reduction in vibrations can be achieved, so that the generator 20 and other components are effectively protected from the detrimental effects of material fatigue and stress.

Figure 9:
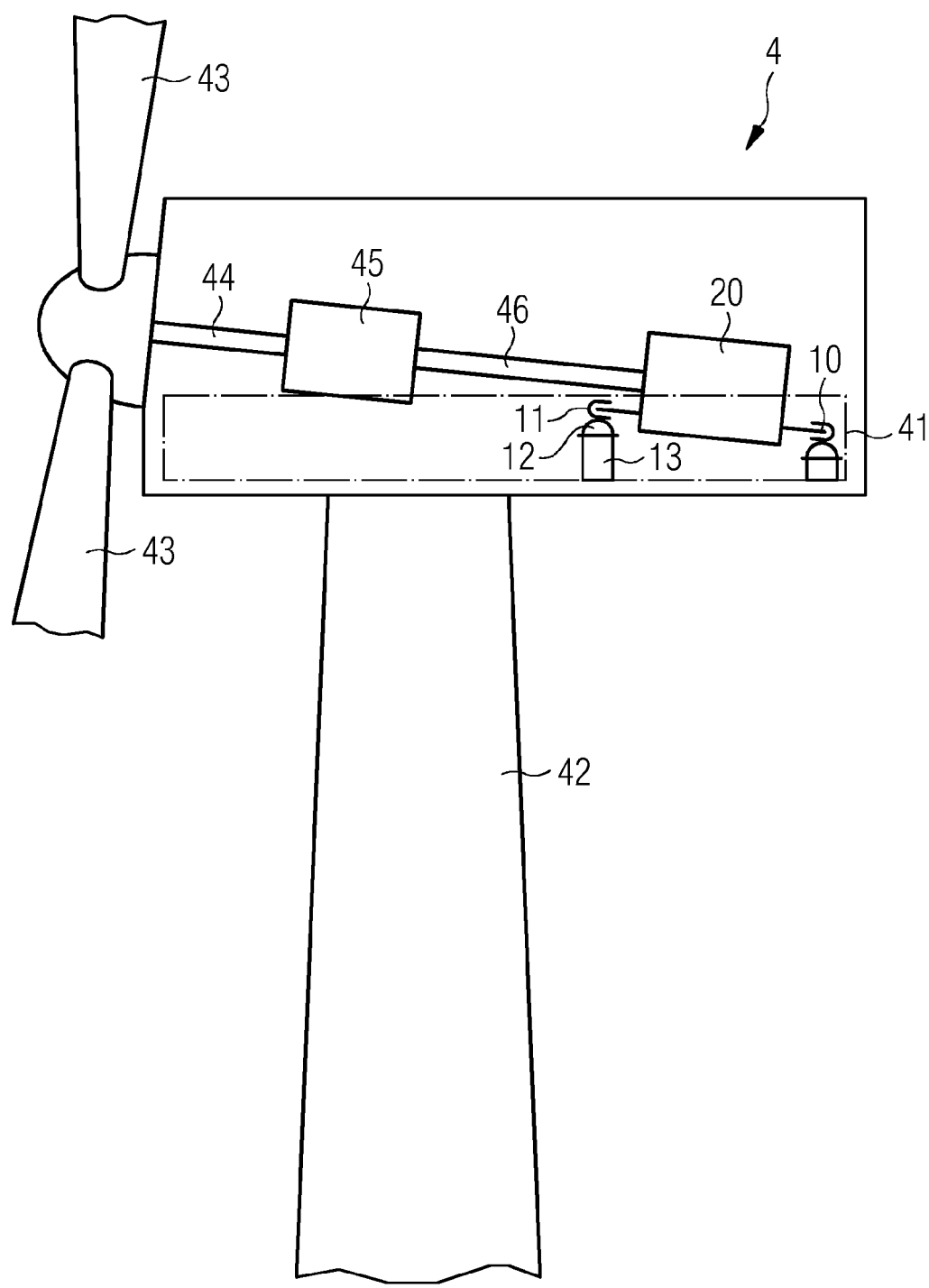
FIG. 9 shows a schematic representation of an embodiment of a wind turbine.

FIG. 9 shows a simplified schematic representation of an embodiment of a wind turbine 4. The wind turbine 4 comprises a nacelle 40 mounted on top of a tower 42, and has a rotor with a number of blades 43 to turn a low-speed shaft 44. This enters a gearbox 45, which converts the lower rotational speed into a higher rotation speed of a high-speed shaft 46. The high-speed shaft 46 in turn drives the generator 20. Manufacturing tolerances, wear and tear, and various other alignment factors mean that any vibration or offset in the low-speed shaft 44 and/or gearbox 45 may be transferred to the high-speed shaft 46 and may possibly also be amplified. The generator 20 itself may also have a tendency to vibrate for various reasons. The generator suspension arrangement 1 ensures that any vibration experienced by the generator 20 is transferred to the suspension assemblies 10, 11, 12, where such vibrations are effectively absorbed, while the weight of the generator 20 is ultimately carried by the bedframe I-beam arrangement 41 (indicated by the broken lines).

Another embodiment (not shown) of the wind turbine 4 of FIG. 9 comprises a direct drive generator without a gearbox. In this embodiment, the rotor's low speed shaft 44 is directly connected to the generator 20.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A generator suspension arrangement for suspending a generator unit of a wind turbine comprising:
   a suspension assembly mounted to a bedframe of the wind turbine, the suspension assembly including a plurality of suspension points arranged to support a front end of the generator unit and a rear end of the generator unit, the plurality of suspension points configured to transfer a weight of the generator unit to the suspension assembly; and
   a vertical offset structure between the bedframe of the wind turbine and the suspension assembly;
   wherein the plurality of suspension points are arranged at a distance outward from a body of the generator unit.

2. The generator suspension arrangement according to claim 1, wherein the suspension assembly comprises a front suspension assembly configured to suspend a front end of the generator unit and a rear suspension assembly configured to suspend a rear end of the generator unit.

3. The generator suspension arrangement according to claim 1, comprising an interface structure configured to connect the generator unit to the suspension assembly.

4. The generator suspension arrangement according to claim 3, wherein the interface structure comprises an end frame for arranging at one end of the generator unit and at least one suspension plate configured to extend from an end frame to the suspension assembly.

5. The generator suspension arrangement according to claim 4 wherein a suspension plate extends to the suspension assembly in a plane essentially parallel to an axis of rotation of a generator of the generator unit.

6. The generator suspension arrangement according to claim 4, wherein the suspension assembly comprises a plurality of clamps, wherein a clamp of the plurality of clamps is configured to clamp about the suspension plate.

7. The generator suspension arrangement according to claim 1, wherein the suspension assembly comprises a damper between a suspension point and a vertical offset structure.

8. The generator suspension arrangement according to claim 1, wherein a mounting plane defined by the plurality of suspension points comprises an essentially horizontal plane.

9. The generator suspension arrangement according to claim 1, wherein a mounting plane defined by the plurality of suspension points comprises an inclined plane, the inclined plane being essentially parallel to an axis of rotation of a generator.

10. The generator suspension arrangement according to claim 1, wherein the plurality of suspension points of the suspension assembly are arranged such that a centre of mass of the generator unit lies in a mounting plane or at a distance above the mounting plane, the distance comprises at most 30% of a diameter of the generator unit.

11. The generator suspension arrangement according to claim 10, wherein the distance comprises at most 25% of the diameter of the generator unit.

12. The generator suspension arrangement according to claim 10, wherein the distance comprises at most 20% of the diameter of the generator unit.

13. The generator suspension arrangement according to claim 1, wherein the suspension assembly comprises a rectangular arrangement of four suspension points of the plurality of suspension points, wherein two front suspension points are arranged to support the front end of the generator unit and two rear suspension points are arranged to support the rear end of the generator unit.

14. A wind turbine comprising:
   a generator unit, the generator unit including at least a generator for generating electric power; and
   a generator suspension arrangement according to claim 1 arranged to suspend the generator unit above a bedframe of the wind turbine.

15. The wind turbine according to claim 14, wherein the generator unit comprises a cooling arrangement mounted on top of the generator.

16. A method of reducing vibrations of a generator unit of a wind turbine, the method comprising:
   mounting a suspension assembly of a generator suspension arrangement according to claim 1 on a bedframe of the wind turbine; and
   connecting a generator unit to the plurality of suspension points of the suspension assembly to transfer a weight of the generator unit to the suspension assembly.

* * * * *